United States Patent [19]
Imano et al.

[11] Patent Number: 5,875,363
[45] Date of Patent: Feb. 23, 1999

[54] CAMERA SHUTTER

[75] Inventors: Seiichi Imano; Kazuo Akimoto, both of Yotsukaido, Japan

[73] Assignee: Seiko Precision Inc., Japan

[21] Appl. No.: 954,741

[22] Filed: Oct. 20, 1997

[30] Foreign Application Priority Data

Oct. 18, 1996 [JP] Japan ................................. 8-276433

[51] Int. Cl.$^6$ .............................. G03B 7/00; G03B 9/00
[52] U.S. Cl. ....................... 396/245; 396/443; 396/458
[58] Field of Search ................................ 396/242, 244, 396/238, 458, 461, 213, 449, 443

[56] References Cited

U.S. PATENT DOCUMENTS

5,202,721  4/1993  Kobayashi et al. ..................... 396/242

Primary Examiner—W. B. Perkey
Attorney, Agent, or Firm—Adams & Wilks

[57] ABSTRACT

A camera shutter is capable of switching between a spring-drive mode and a motor-drive mode through a single electromagnet without performing an exposure operation. A control circuit controls a stepping motor for rotating a driving ring and the electromagnet for controlling the opening and closing operations of the diaphragm. A control circuit operates in a mode in which a first switch is turned ON, and in another mode in which a second switch is turned ON. When the first and second switches are turned ON, a normal photographing operation can be performed. However, when the first switch is turned ON and then OFF while keeping the second switch OFF, a power supply stop signal is transmitted to the electromagnet so that a closing sector is released from its restrained condition allowing the shutter to return to its initial state. When a photographer presses a shutter button after changing the mode, a photographing operation can be performed in the changed mode without the necessity of completing an exposure operation in the first selected mode.

8 Claims, 10 Drawing Sheets

CAMERA SHUTTER

FIELD OF THE INVENTION

The present invention relates generally to a camera shutter and, more particularly, to a camera shutter that is capable of selection between a shutter opening operation by a spring and a shutter opening operation by a motor and that is capable of controlling the diaphragm and the shutter speed independently of each other depending on the photographing conditions.

BACKGROUND INFORMATION

There is known a camera shutter which is capable of selection between a shutter opening operation by a spring and a shutter opening operation by a motor and which is capable of controlling the diaphragm and the shutter speed independently of each other depending on the photographing conditions. For example, there is a camera shutter in which the timing of the operation of a shutter opening member and the timing of operation of a shutter closing member are controlled by separate electro-magnets (see Japanese Unexamined Patent Publication No. H6-138515).

In contrast, the present applicant proposed a camera shutter having a structure such that the diaphragm is set to a predetermined value by causing a closing member to operate by a driving ring capable of turning clockwise and counterclockwise through a motor, and the lens opening is closed by the closing member after opening a shutter sector by an opening member, wherein when the driving member begins to operate from a first state, the operation of the opening member is restrained by an opening controlling portion of the driving ring and when the driving member begins to operate from a second state, the operation of the opening member is restrained by an opening restraining member. This is described in Japanese Unexamined Patent Publication No. H7-261239.

Of the above-described two known technologies, the former has had the problem that since it requires two electromagnets and spaces for setting these electromagnets and a power supply for energizing the electromagnets, it is not possible to obtain miniaturization and power savings.

On the other hand, it can be said that the latter technology has solved the problems of miniaturization and power savings since the provision of a single electromagnet can be used. However, this latter technology has also had the problem that when the release button is once pressed in a spring-drive mode, unless the operation of the camera up to the termination of photographing including exposure is performed, the shutter can not be returned to its initial state because the shifting from the spring-drive mode to the motor-drive mode can not be effected until the photographing operation in the spring-drive mode has been completed.

SUMMARY OF THE INVENTION

In order to solve the above-described problems, the camera shutter according to the present invention is so constructed that the shutter has an opening sector operative in two operating modes, i.e., a motor-drive mode and a spring-drive mode, which can be selectively determined prior to an exposure operation, and a closing sector for controlling the termination of exposure which can be operated independently of a series of operations of the opening sector. After setting one of the operation modes, when a photographing suspension signal is inputted prior to the opening of the opening sector, a control circuit immediately generates a signal for closing the diaphragm so that even when the opening sector is opened and closed, the shutter can return to its initial state without the necessity of performing an exposure operation. Accordingly, by setting any of the opening modes again, a photographing operation is made possible in the set opening mode.

The present invention is characterized in that switching between two opening modes is possible with a camera shutter which is capable of performing an exposure operation at a predetermined diaphragm setting by using a diaphragm and an opening sector and also capable of performing both a diaphragm closing operation and an opening sector opening operation by means of a spring.

As its basic structure, the camera shutter according to the present invention comprises a driving ring capable of turning around a lens opening by a motor, an opening lever for operating an opening sector driven by the turning of the driving ring, a restraining member capable of restraining the opening lever to be held in a closed state, a controlling member for controlling the driving of the closing lever, a control circuit for controlling the motor and the controlling member, a first switch for generating a preliminary operation signal for causing the control circuit to perform an exposure preliminary operation, and a second switch for generating an exposure signal for effecting an exposure operation. The control circuit operates such that when the first switch generates the preliminary operation signal and then stops generating the signal while the second switch does not generate the exposure signal, the circuit releases the control by the controlling member thus allowing the diaphragm to be closed by the closing lever and then the shutter is returned to its initial state.

DETAILED DESCRIPTION OF THE PREFERRED EMBODIMENT

An embodiment of the present invention will be described with reference to the accompanying drawings.

Figure 1:
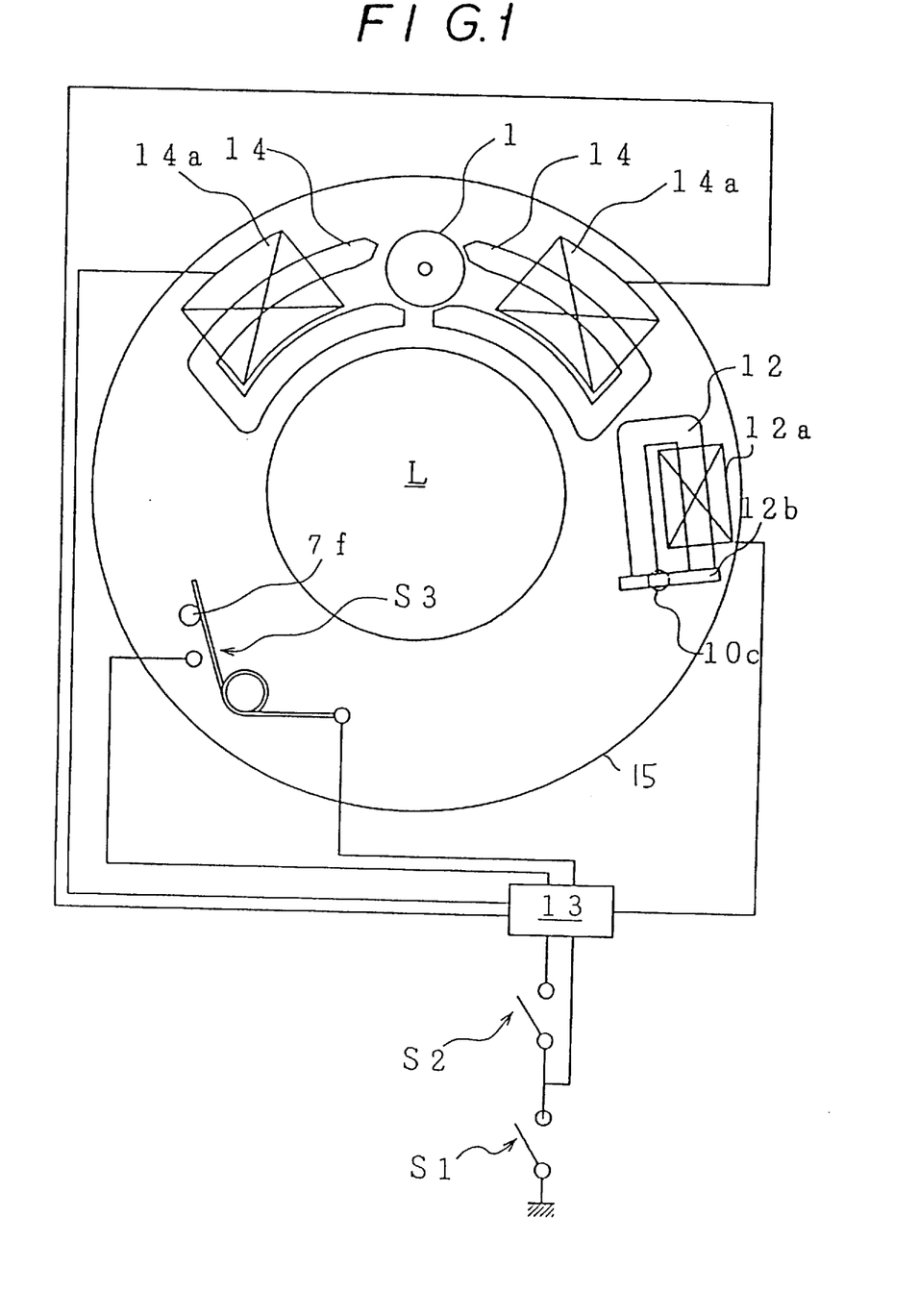
FIG. 1 is a plan view of a stepping motor used in a camera shutter according to one embodiment of the present invention.

As shown in FIG. 1, a camera shutter is driven by a known stepping motor comprising a rotor 1 in the form of a permanent magnet, a stator 14 and a coil 14a. An electromagnet 12 arranged side by side with the stator 14 is excited by a coil 12a, and an armature in the form of an iron strip 12b adapted to be attracted and released by the electromagnet 12 is connected to an operating section 10c of a closing lever 10 (described later). A motor base plate 15 is arranged opposite to a shutter base plate 21 (described later).

A control circuit 13 controls the forward and reverse rotations of the stepping motor by applying predetermined drive pulses to the coil 14a according to the conditions of a first switch S1 and a second switch S2 and also selectively controls the power to be supplied to the coil 12a of the electromagnet 12. The switches S1 and S2 are operated by pressing the same shutter button such that the first switch S1 turns ON when the button is half-pressed and turns OFF when the button is released while the second switch S2 turns ON when the button is fully pressed from the half-pressed state for turning the first switch ON. Accordingly, when the button is half-pressed and when it is released, the second switch S2 is OFF. A third switch S3 is controlled to turn ON and OFF by being brought into contact, and out of contact, with a pin 7f of an opening lever 7 (described later). The switch S3 is kept OFF before it begins to operate.

Figure 2:
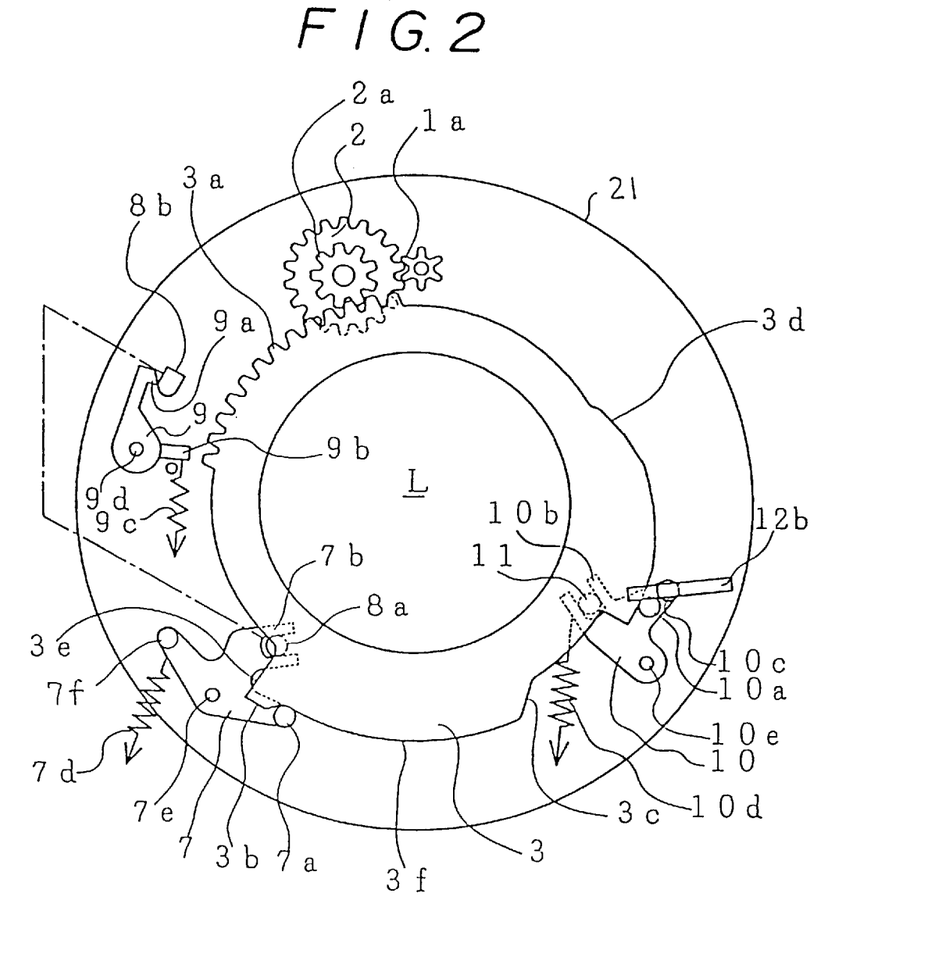
FIG. 2 is a plan view of a drive mechanism used in the camera shutter in a state prior to the start of operation of the drive mechanism.

As shown in FIG. 2, the drive mechanism comprises a rotor pinion 1a fixed to a rotor shaft so as to rotate with the rotor 1 of the stepping motor. A gear 2 is formed integral with a pinion 2a and is rotatably supported on a shutter base plate 21 while it is held in engagement with the rotor pinion 1a. A driving ring 3 which constitutes a driving means for the shutter has on its outer periphery a tooth section 3a meshing with the pinion 2a, cam portions 3b, 3c and 3d which form an opening control section, an end portion 3e and a circumferential portion 3f rotatably supported around a photographic lens L.

The opening lever 7 for operating an opening sector includes an operating portion 7a which moves with the driving ring 3 by engaging the cam portions 3c and 3d and the circumferential portion 3f, and a forked portion 7b for interlocking the opening sector. The opening lever 7 is pivotally supported on the shutter base plate 21 through a pin 7e so as to oscillate freely in a state in which it is urged to swing counterclockwise by a spring 7d. Further, a pin 8a for operating the opening sector (not shown) is in engagement with the forked portion 7b. In the initial state of the shutter, the oscillation of the opening lever 7 is stopped because the operating portion 7a is in contact with the circumferential portion 3f of the driving ring 3. The pin 7f provided at the other end of the opening lever 7 is in engagement with the third switch S3 so that the switch S3 is controlled in such a manner that the switch is kept OFF in its initial state and it turns ON immediately before the opening lever 7 oscillates to cause the opening sector to form a pin hole (see FIG. 1).

An engaging lever 9 is attached to a position on the shutter support plate 21 other than the position at which the opening lever 7 is attached and constitutes a restraining member for restraining the opening sector to be in a closed state. The engaging lever 9 is pivotally supported by a pin 9d so as to oscillate freely and has a pawl portion 9a and an arm portion 9b engageable with the end portion 3e of the driving ring 3. The engaging lever 9 is urged by a spring 9c to rotate clockwise. An engaging portion 8b is made to rotate about the photographic lens L integrally with the pin 8a and functions to restrain the opening sector by engaging the pawl portion 9a. In its initial state, the pawl portion 9a is in contact with the side surface of the engaging portion 8b so that the opening sector is held in an unrestrained state (see FIG. 2).

The closing lever 10 includes a pin 10a engaging the cam portion 3d, a forked portion 10b and an operating portion 10c. The closing lever 10 is pivotally supported by a pin 10e so as to oscillate freely in a state in which it is urged counterclockwise by a spring 10d. A pin 11 for operating the diaphragm is in engagement with the forked portion 10b.

A controlling member 12b engages with the operating portion 10c in such a manner that when the controlling member 12 is attracted by the electromagnet 12, the operation of the closing lever 10 is controlled (see FIG. 1). The controlling member 12b is in the form of a rectangular iron strip and operates such that when it is attracted by the electromagnet 12 upon supplying power to the coil 12a, it restrains the closing lever 10 and when the supply of power is stopped, the control on the closing lever is released.

Figure 7:
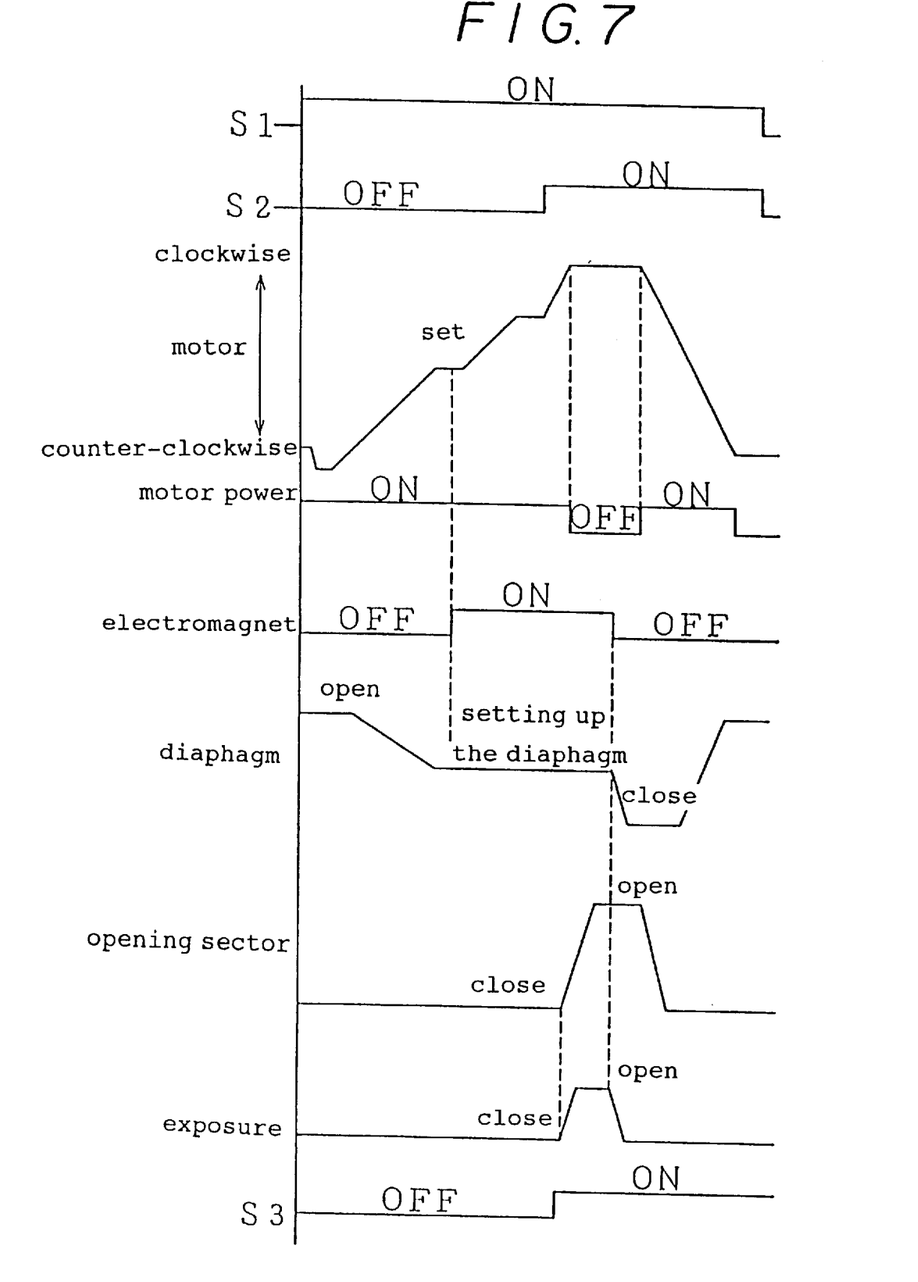
FIG. 7 is a timing diagram showing shutter opening and shutter closing operations by means of a spring used in the camera shutter according to one embodiment of the present invention.

A description will be made of how the camera shutter having the above configuration performs an exposure operation using springs as the driving force to open and close the shutter. FIG. 7 shows how such exposure operation proceeds with a lapse of time.

Figure 3:
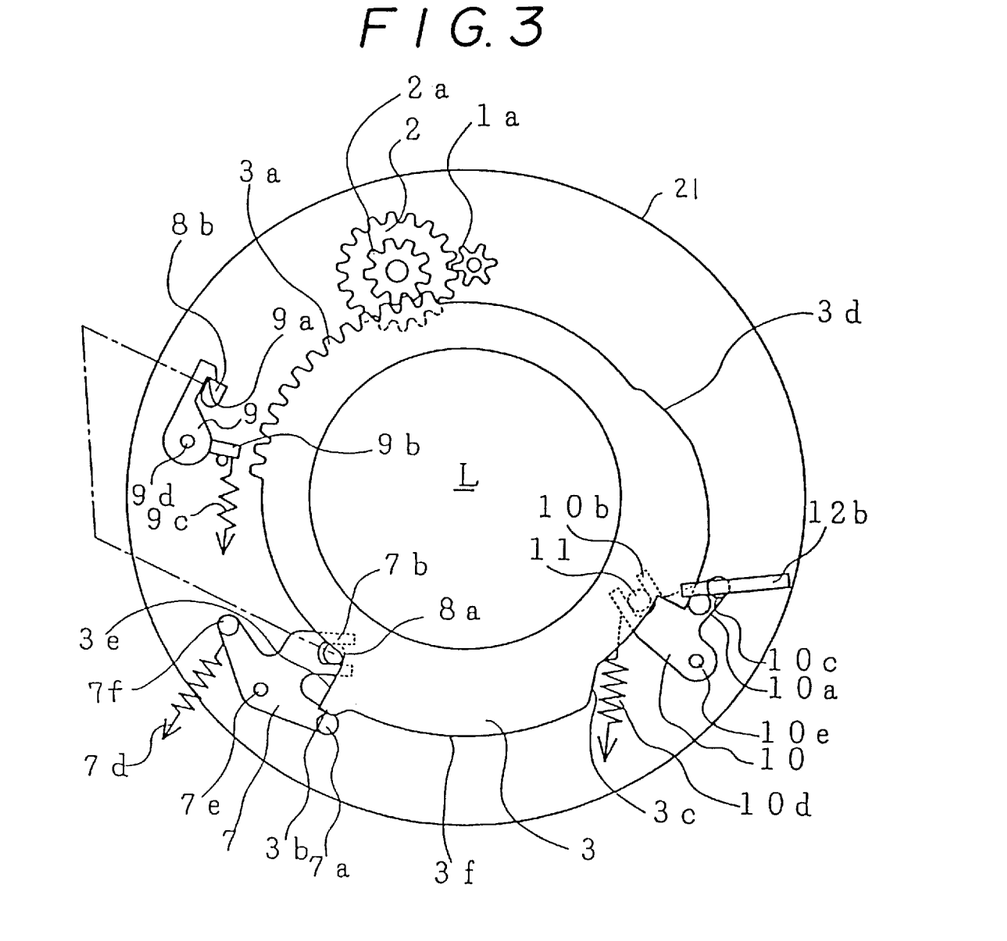
FIG. 3 is a plan view of the drive mechanism in a state in which the drive mechanism is rotated counterclockwise.

When the shutter button (not shown) in the state shown in FIG. 2 is half-pressed to turn the first switch S1 ON and a preliminary operation signal is outputted, the stepping motor is rotated counterclockwise. Then the driving ring 3 turns counterclockwise through the gear 2 and the tooth portion 3a due to the counterclockwise rotation of the rotor 1 of the stepping motor. In this case, the operating portion 7a of the opening lever 7 is pushed by the cam portion 3b so that the opening lever 7 pivots clockwise against the force of the spring 7d and the pin 8a is rotated counterclockwise by the forked portion 7b to thereby cause the engaging portion 8b to likewise rotate clockwise. Thus, when the engaging portion 8b comes to a position at which it engages the pawl portion 9a due to the counterclockwise movement of the driving ring 3, the engaging lever 9 pivots clockwise by the action of the spring 9c to thereby engage the engaging portion 8b. Thus, the opening lever 7 is forced to be non-operational through the pin 8a against the force of the spring 7d (see FIG. 3).

Figure 4:
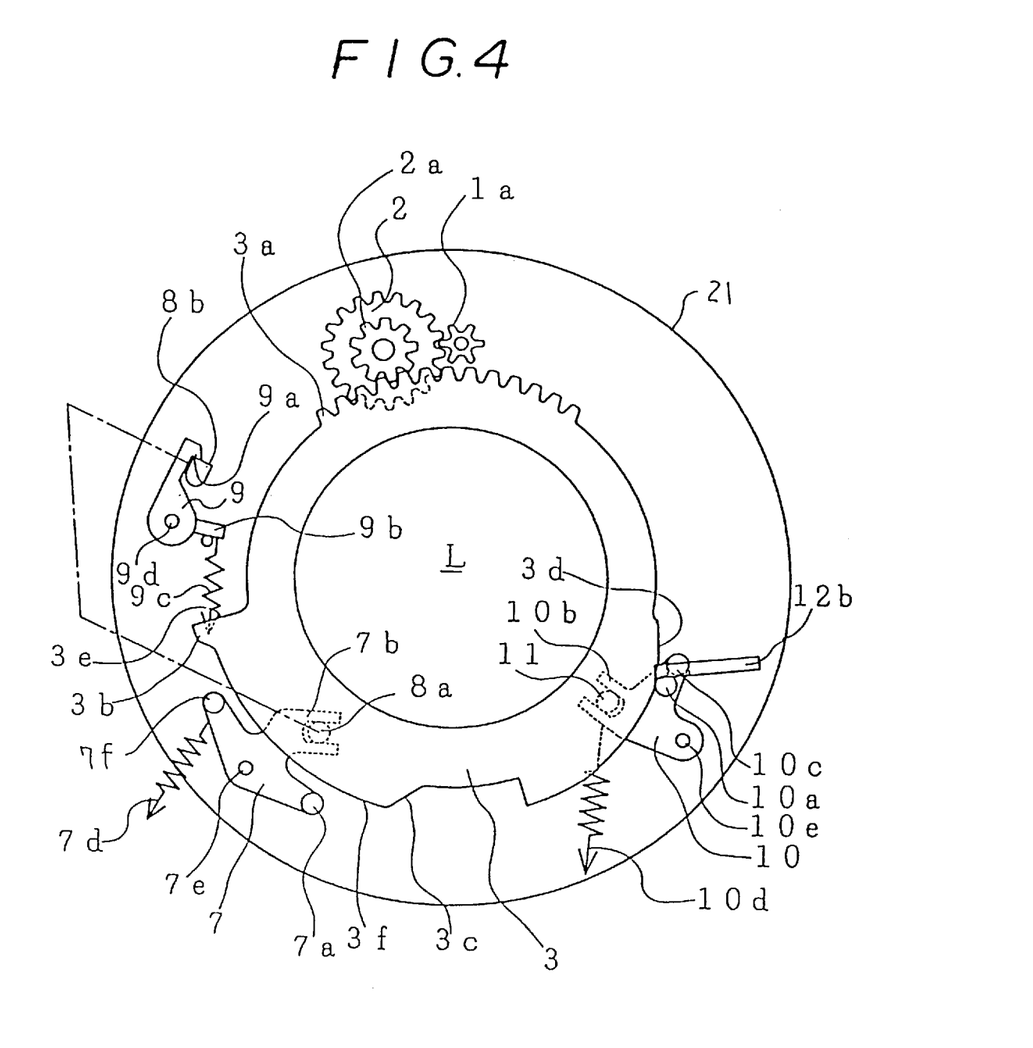
FIG. 4 is a plan view of the camera shutter according to one embodiment immediately after setting a diaphragm.

Next, when the stepping motor turns to rotate clockwise, the control circuit 13 controls the power supply or energization timing of the coil 12a so as to set a diaphragm aperture of the photographic lens L in synchronism with the rotation of the stepping motor. That is, at this point in time, since the coil 12a is not energized, when the driving ring 3 turns clockwise, the pin 10a follows the cam portion 3d to cause the closing lever 10 to pivot counterclockwise by the spring 10d so that the pin 11 is moved to rotate the diaphragm clockwise until a predetermined diaphragm setting is attained. Then, the control circuit 13 energizes the coil 12a to excite the electromagnet 12 with the result that the iron strip 12b is attracted by the magnet 12 to restrain the closing lever 10 to be held in its inoperative state against the force of the spring 10d at the position of the cam portion 3d corresponding to a predetermined diaphragm setting, thereby setting the diaphragm (see FIGS. 4 and 7).

The driving ring 3 continues to turn clockwise until it stops immediately before the end portion 3e lying adjacent to the cam portion 3b engages the arm portion 9b, and during the time when the first switch S1 is kept ON, the driving ring 3 retains its stopped position. In this case, when the shutter button is fully pressed, the second switch S2 turns ON and when the ON-state of the second switch S2 is detected, the opening sector is opened to effect exposure (see FIG. 7).

Figure 5:
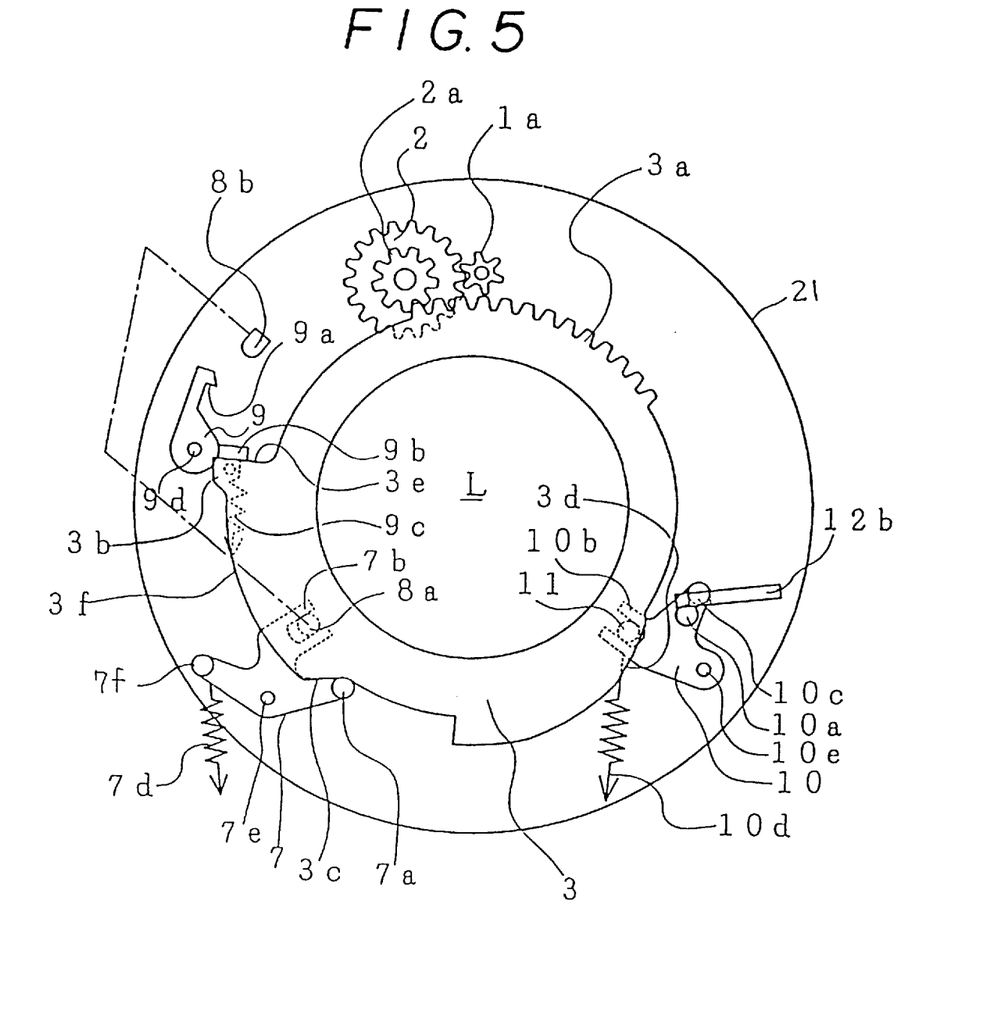
FIG. 5 is a plan view of the shutter according to one embodiment when a shutter opening operation is performed.

The foregoing exposure is effected in the following manner. When the stepping motor begins to rotate clockwise, the end portion 3e of the driving ring 3 comes into contact with the arm portion 9b to cause the engaging lever 9 to pivot counterclockwise against the force of the spring 9c to thereby release the engaging portion 8b. In this case, the opening lever 7 quickly pivots counterclockwise by the action of the spring 7d so that the pin 8a is rotated clockwise to move the opening sector (not shown) quickly toward the direction in which the lens opening is opened and begins to effect exposure at the present diaphragm setting. When the opening lever 7 pivots counterclockwise, the pin 7f turns the switch S3 ON. (see FIG. 1). Also, in this case, the supply of power to the stepping motor is interrupted (FIG. 5) so that the exposure operation is continued by maintaining the state in which the opening sector is opened.

Figure 6:
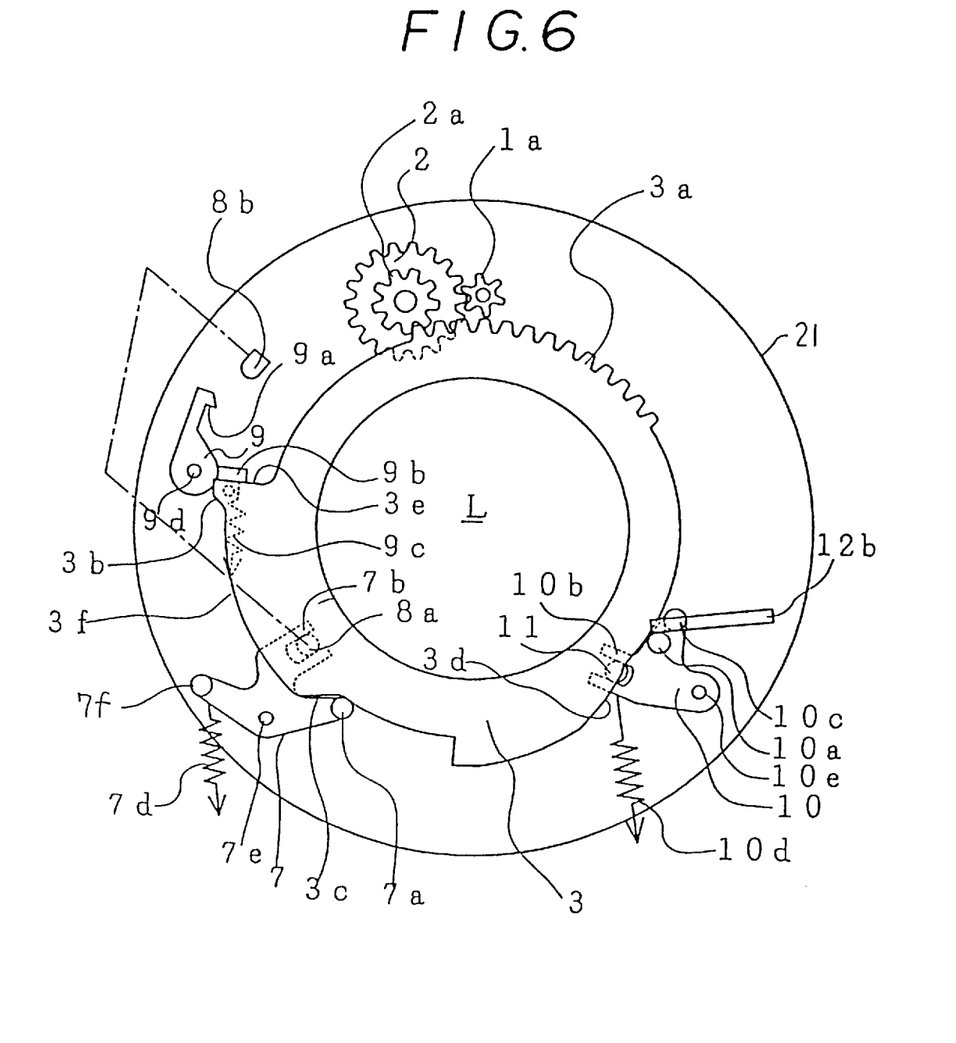
FIG. 6 is a plan view of the shutter immediately after a shutter closing operation.

As described above, the lens opening is set to a diaphragm value corresponding to a position of the cam portion 3d of the driving ring 3 where the electromagnet 12 restrains the closing lever 10. After a lapse of a predetermined period of time set up in accordance with a desired exposure time from the turning ON of the switch S3, when the control circuit 13 interrupts the supply of power to the coil 12a, the electromagnet 12 is demagnetized and the closing lever 10 quickly pivots counterclockwise due to the action of the spring 10d, so that the pin 11 is moved to quickly close the diaphragm sectors, thereby the exposure operation. In this case, since the supply of power to the coil 12a of the electromagnet 12 had been interrupted when the engaging portion 8b was released, the electromagnet 12 is not affected by a leakage magnetic flux and, accordingly, the iron strip 12b can operate smoothly (see FIG. 6). Thereafter, the driving ring 3 rotates counterclockwise by the counterclockwise rotation of the stepping motor.

On the other hand, the operating portion 7a is pushed by the cam portion 3c of the driving ring 3 so that the opening lever 7 pivots clockwise against the force of the spring 7d to move the pin 8a to thereby close the opening sectors which are in an open state. Further, when the stepping motor is rotated counterclockwise, the pin 10a of the closing lever 10 is pushed by the cam portion 3d and the closing lever 10 pivots clockwise against the force of the spring 10d. As a result, the pin 11 moves to open the diaphragm sectors which are in a closed state. The stepping motor 1 stops at a position at which the shutter has returned to the initial state shown in FIG. 1, thereby completing one cycle of photographing operation. FIG. 7 is a timing diagram showing the above-described operation.

Figure 8:
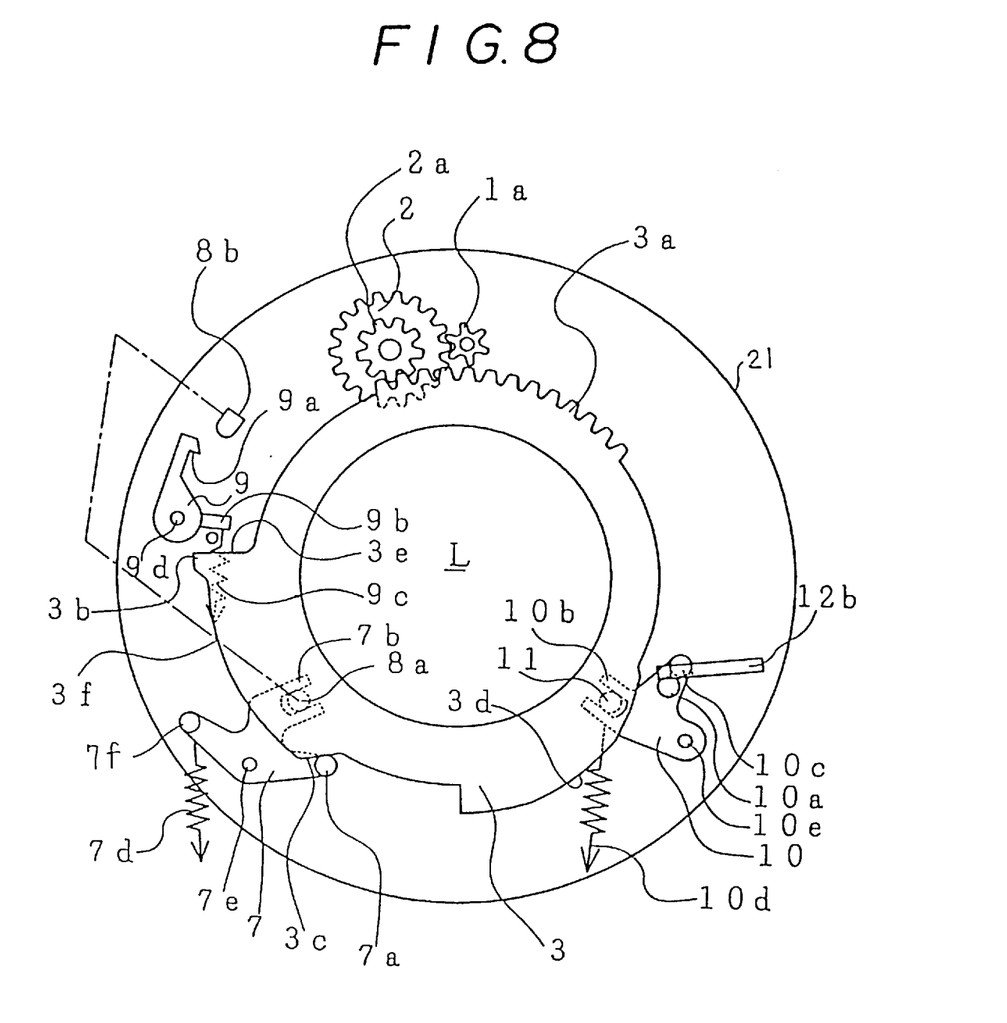
FIG. 8 is a plan view of the camera shutter according to the present invention when a shutter opening operation is performed by means of a motor.
Figure 9:
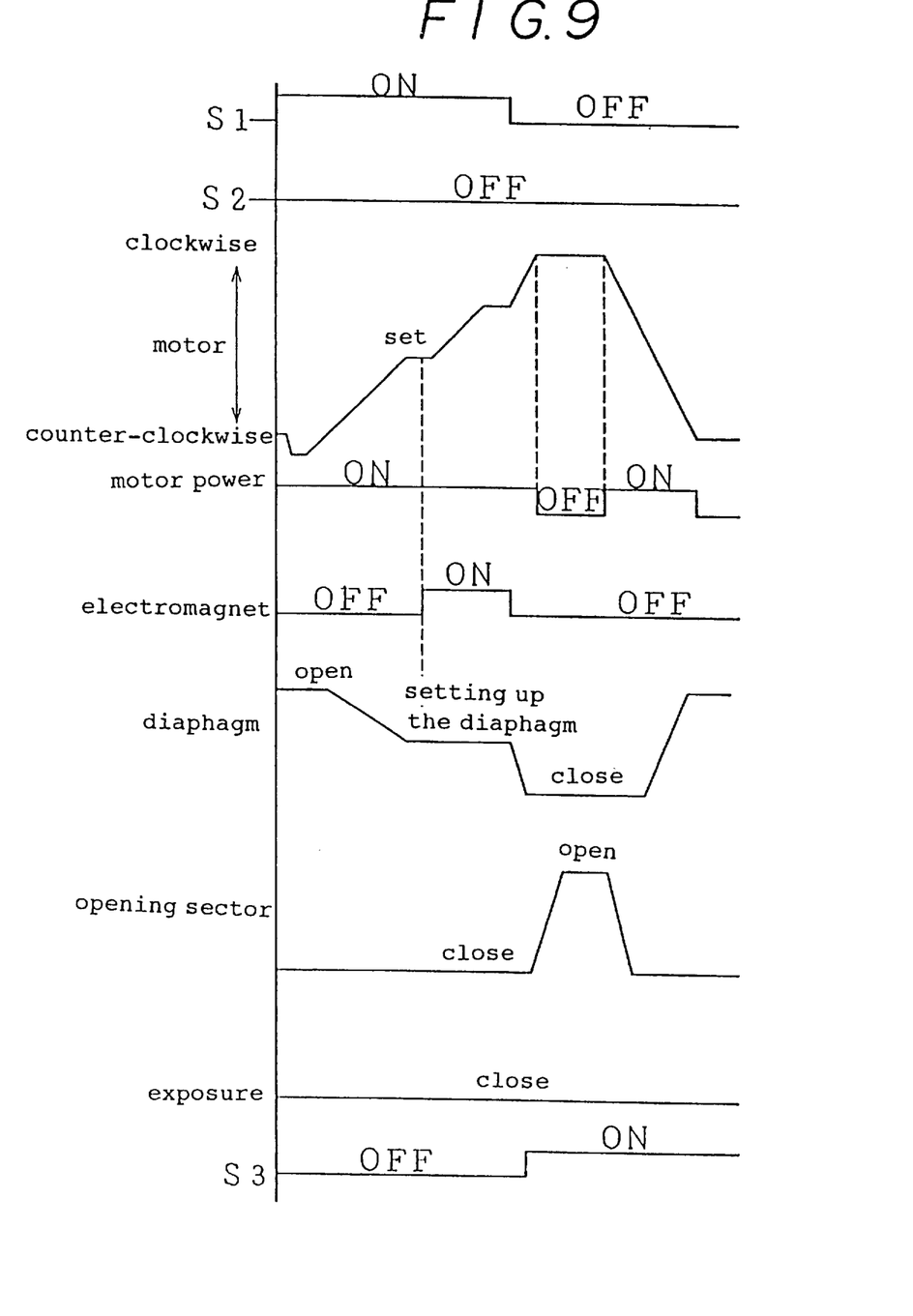
FIG. 9 is a timing diagram showing shutter opening and closing operations when an exposure operation is suspended in the camera shutter according to the embodiment of the present invention.

Next, the operation of the camera shutter when an exposure operation is suspended after the first switch S1 is pressed will be described with reference to FIGS. 8 and 9. It is noted that the operation from the initial set up of the diaphragm by the photographer up to the stoppage of the end portion 3e of the driving ring 3 immediately before the end portion 3e comes into engagement with the arm portion 9b is the same as the operation in the case in which exposure is effected.

At this point in time, that is, at the time when the shutter button is released at the point at which the end portion 3e of the driving ring 3 has stopped immediately before the arm portion 9b from the turning ON of the first switch S1 by keeping the shutter button half-pressed by the photographer, the first switch S1 is turned OFF by releasing the shutter button. In this case, when the control circuit 13 detects the turning OFF of the switch S1, the exposure operation is interrupted. That is, the control circuit 13 immediately interrupts the supply of power to the coil 12a and the closing lever 10 pivots counterclockwise by means of the spring 10d to thereby close the lens opening. When the stepping motor begins to rotate clockwise again, the end portion 3e of the driving ring 3 comes into contact with the arm portion 9b to cause the engaging lever 9 to pivot counterclockwise against the force of the spring 9c to thereby release the engaging portion 8b. In this case, the opening lever 7 quickly pivots counterclockwise by the energizing force of the spring 7d with the result that the pin 8a of the opening sector is moved to allow the lever 7 to oscillate quickly in a direction in which the lens opening is opened. However, since the opening is already closed by the diaphragm, no exposure is effected (see FIG. 8). Thereafter, the stepping motor rotates counterclockwise and returns to its initial state in the same manner as when the above-described exposure is effected. FIG. 9 is a timing diagram showing the above-described operation.

Figure 10:
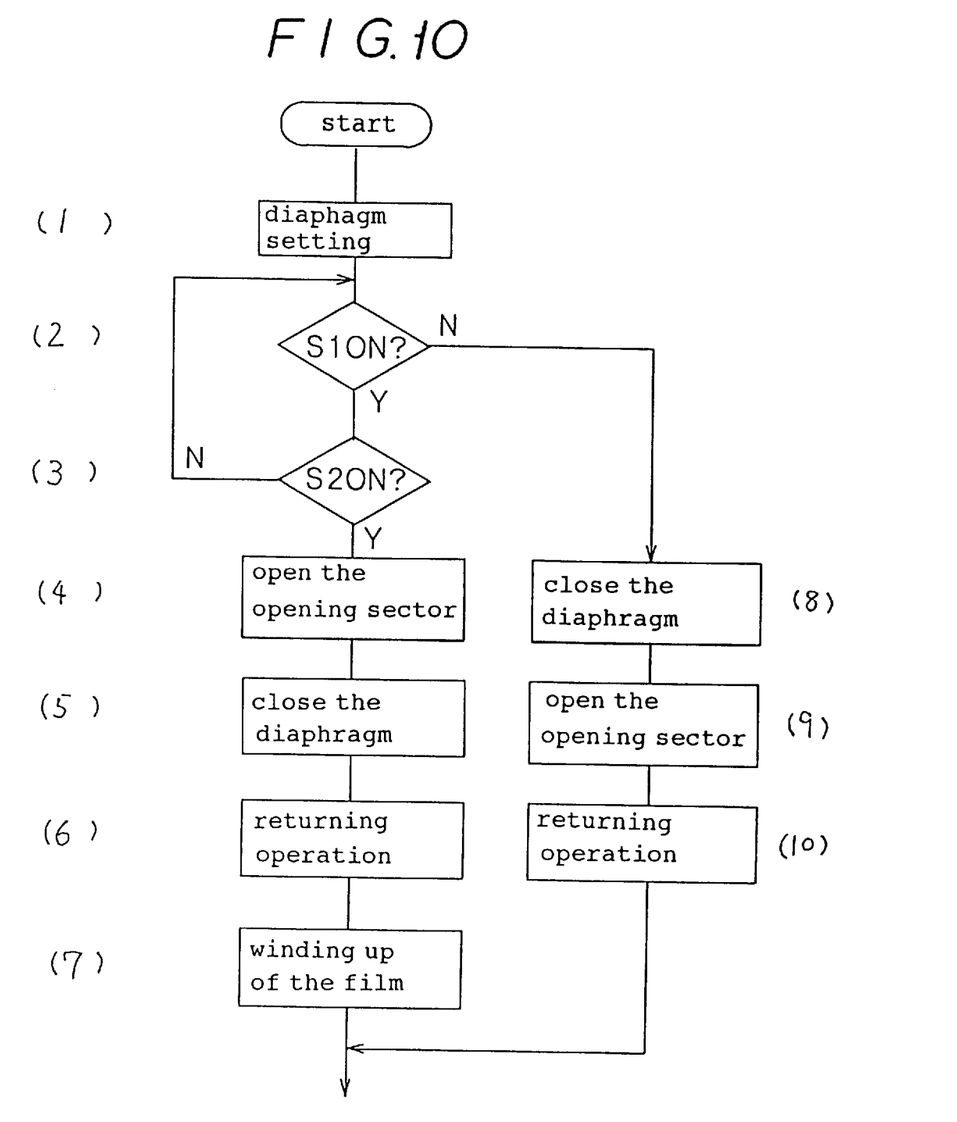
FIG. 10 is a flow chart illustrating how the camera shutter according to the embodiment of the present invention is opened and closed.

FIG. 10 shows a flow chart for illustrating the operation of the above-described shutter. First, when a diaphragm setting is made (Step 1), the control circuit 13 judges the ON/OFF condition of the first switch S1 (Step 2), and if the first switch S1 is judged to be ON, the control circuit 13 supplies power to the coil 14 to rotate the stepping motor 1 to thereby open the opening sector by the rotation of the driving ring 3 (Step 4). Next, the control circuit 13 supplies power to the coil 12a of the electromagnet 12 in compliance with a predetermined exposure time and timing to close the diaphragm (see FIG. 5). Thus, by opening the opening sector and closing the diaphragm, an exposure operation at a predetermined diaphragm setting is effected. Then, a returning operation is effected by an output signal from the control circuit 13 (Step 6) and the shutter is returned to its initial state by winding up of the film (Step 7).

In contrast, when, after making a diaphragm setting, the shutter button is released from its half-pressed state and the first switch SI is judged to be OFF, the control circuit 13 closes the diaphragm (Step 8) and allows the diaphragm to be opened (Step 9) so that, as described above, no exposure operation is performed even when the opening sector is opened in the state in which the diaphragm is closed. Subsequently, a returning operation (Step 10) begins in which the motor is rotated counterclockwise to allow the shutter to return to its initial state. Accordingly, when, for example, the photographer desires to effect the spring-drive mode after he has once set up the motor-drive mode and pressed the first switch S1, it is possible for him to return the shutter to its initial state through the steps 8 through 10 without an exposure operation only if he holds his hand off the first switch S1.

According to the present invention, the motor-drive mode may have the same sequence as the spring-drive mode. In this case, due to an increase in the number of commonly controllable portions, the amount of storage of the control circuit can be reduced. Further, the shutter may be so constructed that it can be returned to its initial state by rotating the motor counterclockwise when the OFF condition of the switch S1 is detected by the control circuit.

Further, although, in the present embodiment the shutter is described to have no lens driving mechanism, it may have such mechanism and in that case, the lens position setting is performed when the switch S1 has been turned ON.

As regards the shutter opening and closing operations shown in FIG. 7, the control of the exposure time according to the brightness of an object to be photographed by setting a diaphragm value in advance and the control of the diaphragm value according to the brightness of the object by setting an exposure time in advance can be realized on the basis of the same concept, and in either of the above two cases, the control operation may be made manually.

In the foregoing description, a practical example using a stepping motor has been given, but if the speed of the motor can be controlled freely, other types of motors, such as, for example, a supersonic motor, may be used. Furthermore, the electromagnet 12 may be of the type in which a plunger operates upon energization, of the type that makes use of a rotatable permanent magnet rotor, or of the type in which the closing lever 10 can be released by a suitable method.

According to the camera shutter of the present invention, it is possible to construct a shutter capable of controlling its shutter opening waveform by using only a single electromagnet. Additionally, the camera shutter of the present invention eliminates the disadvantage of conventional camera shutters which cannot be returned to their initial state without performing an exposure operation. To this effect, the present invention makes it possible for the camera shutter to return to its initial state without performing the exposure operation even after an operation mode is set up.

We claim:

1. A camera shutter comprising: a driving member mounted for displacement; means for displacing the driving member in forward and reverse directions; an opening member driven by the driving member for operating an opening sector; a restraining member for restraining operation of the opening member; a closing member driven by the driving member for operating a closing sector; a controlling member for controlling the driving of the closing member; a control circuit for controlling the controlling member and the means for displacing the driving member; first signal generating means for generating a preliminary operation signal to cause the control circuit to perform an exposure preliminary operation; and second signal generating means for generating an exposure signal for performing an exposure operation; wherein when the first signal generating means stops generating the preliminary operation signal while the second signal generating means does not generate the exposure signal after the preliminary operation signal is generated from the first signal generating means, the control circuit controls the controlling member to drive the closing member.

2. A camera shutter as claimed in claim 1; wherein the means for displacing the driving member comprises a stepping motor.

3. A camera shutter comprising:

a driving ring mounted for rotation around a lens opening;

a motor for rotating the driving ring;

an opening lever driven by the driving ring for operating an opening sector between an opened state and a closed state;

a restraining member for restraining the opening lever in the closed state;

a closing lever driven by the driving ring for operating a closing sector;

a controlling member for controlling the driving of the closing lever;

a control circuit for controlling the motor and the controlling member;

a first switch for generating a preliminary operation signal to cause the control circuit to perform a preliminary exposure operation; and a second switch for generating an exposure signal for performing an exposure operation;

wherein when the first switch stops generating the preliminary operation signal while the second switch does not generate the exposure signal after the preliminary operation signal is generated from the first switch, the control circuit releases the control by the controlling member and allows the shutter to return to an initial state after driving the closing lever.

4. A camera shutter as claimed in claim 3; wherein the motor comprises a stepping motor.

5. A camera shutter comprising: a closing sector; a closing member for operating the closing sector; a controlling member for controlling the closing member to operate the closing sector; a control circuit for controlling the controlling member; first signal generating means for generating a preliminary operation signal for performing a preliminary exposure operation; and second signal generating means for generating an exposure signal for performing an exposure operation; wherein when the first signal generating means, upon generating the preliminary operation signal, stops generating the preliminary operation signal while the second signal generating means does not generate the exposure signal, the control circuit controls the controlling member to control the closing member to operate the closing sector to thereby allow the camera shutter to return to an initial state.

6. A camera shutter according to claim 5; further comprising a driving member for driving the closing member to operate the closing sector; and means for displacing the driving member in forward and reverse directions.

7. A camera shutter according to claim 6; wherein the means for displacing the driving member comprises a stepping motor.

8. A camera shutter comprising: a closing member for operating a closing sector; a driving member for driving the closing member to operate the closing sector; a stepping motor for rotating the driving member to drive the closing member; a restraining device for restraining operation of the closing sector; a control circuit for controlling the stepping motor and the restraining device; a first switch switchable between an ON condition, in which a preliminary operation signal is generated for causing the control circuit to perform an exposure preliminary operation, and an OFF condition, in which the preliminary operation signal is not generated; and a second switch switchable between an ON condition, in which an exposure signal for performing an exposure operation is generated, and an OFF condition, in which the exposure signal is not generated; wherein when the first switch is switched ON and then OFF while maintaining the second switch in the OFF condition, the control circuit controls the restraining device to release the closing sector from the restraining condition to thereby allow the camera shutter to return to an initial state.

* * * * *